US006025061A

United States Patent [19]
Khanarian et al.

[11] Patent Number: 6,025,061
[45] Date of Patent: Feb. 15, 2000

[54] SHEETS FORMED FROM POLYESTERS INCLUDING ISOSORBIDE

[75] Inventors: Garo Khanarian, Berkeley Heights; Larry F. Charbonneau, Mendham; Robert E. Johnson, Hoboken, all of N.J.; Helmut B. Witteler, Beindersheim, Germany; Russel G. Lee, Princeton, N.J.; Robert B. Sandor, South Orange, N.J.; Gregory V. Nelson, Lebanon, N.J.

[73] Assignee: HNA Holdings, Inc., Warren, N.J.

[21] Appl. No.: 09/064,862

[22] Filed: Apr. 23, 1998

[51] Int. Cl.$^7$ ............................. B32B 7/02; C08G 63/66
[52] U.S. Cl. .................. 428/221; 528/272; 528/298; 528/300; 528/302; 528/308; 528/308.6
[58] Field of Search ................... 528/272, 298, 528/300, 302, 308, 308.6; 428/221

[56] References Cited

U.S. PATENT DOCUMENTS

| | | |
|---|---|---|
| 2,985,995 | 5/1961 | Bunting, Jr. et al. . |
| 3,199,281 | 8/1965 | Maerov et al. . |
| 3,684,766 | 8/1972 | Jackson, Jr. et al. . |
| 3,785,993 | 1/1974 | Langhans . |
| 3,795,627 | 3/1974 | Langhans et al. . |
| 3,859,445 | 1/1975 | Langhans . |
| 3,871,947 | 3/1975 | Brekken . |
| 3,966,867 | 6/1976 | Munting . |
| 4,146,663 | 3/1979 | Ikeda et al. . |
| 4,157,419 | 6/1979 | Mirhej . |
| 4,159,617 | 7/1979 | Allan . |
| 4,195,161 | 3/1980 | Davis et al. . |
| 4,209,559 | 6/1980 | Wada et al. . |
| 4,223,128 | 9/1980 | Halek et al. . |
| 4,225,549 | 9/1980 | Allan . |
| 4,231,922 | 11/1980 | Robeson . |
| 4,246,381 | 1/1981 | Robeson . |
| 4,255,301 | 3/1981 | Minagawa et al. . |
| 4,259,458 | 3/1981 | Robeson . |
| 4,259,478 | 3/1981 | Jackson, Jr. et al. . |
| 4,294,956 | 10/1981 | Berger et al. . |
| 4,294,957 | 10/1981 | Berger et al. . |
| 4,351,917 | 9/1982 | Calundann et al. . |
| 4,352,927 | 10/1982 | Cogswell et al. . |
| 4,355,080 | 10/1982 | Zannucci . |
| 4,374,239 | 2/1983 | Berger et al. . |
| 4,383,051 | 5/1983 | Meyborg et al. . |
| 4,383,923 | 5/1983 | Elfert . |
| 4,386,186 | 5/1983 | Maresca et al. . |
| 4,408,061 | 10/1983 | Salzburg et al. . |
| 4,413,116 | 11/1983 | Reuter et al. . |
| 4,418,174 | 11/1983 | Dhein et al. . |
| 4,435,562 | 3/1984 | Sullivan et al. . |
| 4,438,226 | 3/1984 | Dirlikov et al. . |
| 4,439,586 | 3/1984 | Kawakami et al. . |
| 4,443,563 | 4/1984 | Dirlikov et al. . |
| 4,456,729 | 6/1984 | Dhein et al. . |
| 4,474,918 | 10/1984 | Seymour et al. . |
| 4,506,066 | 3/1985 | Medem et al. . |
| 4,506,086 | 3/1985 | Salzburg et al. . |

(List continued on next page.)

FOREIGN PATENT DOCUMENTS

| | | |
|---|---|---|
| 0 033089A2 | 8/1981 | European Pat. Off. . |
| 0102 596 A2 | 3/1984 | European Pat. Off. . |
| 96/38282 | 12/1996 | European Pat. Off. . |
| 96/38498 | 12/1996 | European Pat. Off. . |
| 97/00284 | 1/1997 | European Pat. Off. . |
| 1263981 | 3/1968 | Germany . |
| 3229412 A1 | 2/1984 | Germany . |
| 4415353 A1 | 11/1994 | Germany . |
| 195 19 577 | 5/1995 | Germany . |
| 195 19 578 | 5/1995 | Germany . |
| 195 28 336 | 8/1995 | Germany . |
| 195 04 913 | 8/1996 | Germany . |
| 195 38 700 | 4/1997 | Germany . |
| 52018832 | 7/1975 | Japan . |
| 1079686 | 8/1967 | United Kingdom . |
| 1354446 | 5/1974 | United Kingdom . |
| 1408036 | 10/1975 | United Kingdom . |

OTHER PUBLICATIONS

Chemical Abstracts vol. 62, col. 10588, Neth. App. 6,405, 497 (1965).

*Encyclopaedic Dictionary of Commercial Polymer Blends*, Ed. L.A. Utracki, ChemTec Publishing, pp. 10–11, 23, 35–43 (1994).

"Plastics processing," *McGraw–Hill Encyclopedia of Science & Technology*, 6$^{th}$ Edition, pp. 35–40 (1987).

"Plastics Processing," *The Way Things Work*, vol. 2, pp. 56–59 (1971).

*Polymer Alloys and Blends:Thermodynamics and Rheology*, Ed. L.A. Utracki, Hanser Publishers, pp. 256–270, 275–280, 287–293, 297–299 (1990).

*Polymeric Materials Encyclopedia*, "Polyesters (Derived from Renewable Sources)" vol. 8, pp. 5891–5896, CPC Press, Inc. (1996).

Dietrich Braun and Matthias Bergmann "1,4:3,6–Dianhydrohexite als Bausteine Für Polymere" J. prakt. Chem. 334, pp. 298–310 (1992).

Hans R. Kricheldorf, "Sugar Diols' as Building Blocks of Polycondensates," J.M.S.—Rev. Macromol. Chem. Phys., C37(4), pp. 599–631 (1997).

Reinhard Storbeck, Matthias Rehahn and Matthias Ballauff, "Synthesis and properties of high–molecular–weight polyesters based on 1,4:3,6–dianhydrohexitols and terephthalic acid," Makromol. Chem. 194, pp. 53–64 (1993).

Reinhard Storbeck, "Synthese und Charakterisierung von Polyestern auf Basis nachwachsender Rohstoffe," Dissertation, Universität Karlsruhe, 1994.

(List continued on next page.)

*Primary Examiner*—Samuel A. Acquah
*Attorney, Agent, or Firm*—Burns, Doane, Swecker & Mathis, L.L.P.

[57] ABSTRACT

A sheet made of a polyester which includes monomer units of terephthaloyl moieties, ethylene glycol moieties and isosorbide moieties is described. The polyester has an inherent viscosity of at least about 0.35 dL/g when measured as a 1% (weight/volume) solution of said polyester in o-chlorophenol at a temperature of 25° C. The present invention also relates to a method of making the polyester sheet described above and a method of thermoforming the sheet into articles.

40 Claims, No Drawings

U.S. PATENT DOCUMENTS

| | | |
|---|---|---|
| 4,526,923 | 7/1985 | Hornbaker et al. . |
| 4,551,520 | 11/1985 | Morris et al. . |
| 4,557,982 | 12/1985 | Nouda et al. . |
| 4,564,645 | 1/1986 | Salzburg et al. . |
| 4,587,071 | 5/1986 | Minami et al. . |
| 4,605,729 | 8/1986 | Barnes et al. . |
| 4,663,415 | 5/1987 | Grögler et al. . |
| 4,687,830 | 8/1987 | Weber et al. . |
| 4,713,436 | 12/1987 | Downs et al. . |
| 4,725,647 | 2/1988 | Maresca et al. . |
| 4,805,788 | 2/1989 | Akiho . |
| 4,814,426 | 3/1989 | Utsumi et al. . |
| 4,863,046 | 9/1989 | Collette et al. . |
| 4,993,566 | 2/1991 | Eberle . |
| 4,993,567 | 2/1991 | Eberle, Jr. . |
| 5,005,716 | 4/1991 | Eberle . |
| 5,021,289 | 6/1991 | Light et al. . |
| 5,108,675 | 4/1992 | Matsuo et al. . |
| 5,120,822 | 6/1992 | Hoeschele et al. . |
| 5,124,388 | 6/1992 | Pruett et al. . |
| 5,141,120 | 8/1992 | Brown et al. . |
| 5,141,121 | 8/1992 | Brown et al. . |
| 5,153,302 | 10/1992 | Masuda et al. . |
| 5,164,478 | 11/1992 | Lee et al. . |
| 5,179,143 | 1/1993 | König et al. . |
| 5,296,550 | 3/1994 | Natarajan et al. . |
| 5,321,056 | 6/1994 | Carson et al. . |
| 5,382,474 | 1/1995 | Adhya et al. . |
| 5,409,967 | 4/1995 | Carson et al. . |
| 5,412,005 | 5/1995 | Bastioli et al. . |
| 5,484,632 | 1/1996 | Mercer, Jr. et al. . |
| 5,496,887 | 3/1996 | Braune . |
| 5,596,888 | 1/1997 | McLarty, III et al. . |
| 5,607,757 | 3/1997 | Dalton . |
| 5,616,404 | 4/1997 | Sublett . |
| 5,646,236 | 7/1997 | Schafheutle et al. . |
| 5,648,152 | 7/1997 | Diaz-Kotti et al. . |
| 5,654,083 | 8/1997 | Venema . |
| 5,656,719 | 8/1997 | Stibal et al. . |
| 5,709,929 | 1/1998 | Venema . |
| 5,721,397 | 2/1998 | Weinberg . |
| 5,747,175 | 5/1998 | Dietz et al. . |
| 5,766,679 | 6/1998 | Siemensmeyer et al. . |

OTHER PUBLICATIONS

Reinhard Storbeck and Matthias Ballauff, "Synthesis and Thermal Analysis of Copolyesters Deriving from 1,4:3,6–Dianhydrosorbitol, Ethylene Glycol, and Terephthalic Acid," Journal of Applied Polymer Science, vol. 59, pp. 1199–1202 (1996).

D. Braun et al., "Polyesters with 1.4:3.6–dianhydrosorbitol as polymeric plasticizers for PVC," Die Angewandte Makromolekulare Chemie 199, pp. 191–205 (1992).

D. Braun et al., "Grafting of polyesters by free–radical chain transfer," Die Angewandte Makromolekulare Chemie 210, pp. 173–196 (1993).

Estelle Cognet–Georjon et al., "New polyurethanes based on diphenylmethane diisocyanate and 1,4:3,6–dianhydrosorbitol, 1," Macromol. Chem. Phys. 196, pp. 3733–3751 (1995).

Estelle Cognet–Georjon et al., "New polyurethanes based on 4,4'–diphenylmethane diisocyanate and 1,4:3,6 dianhydrosorbitol, 2[a]," Macromol. Chem. Phys. 197, pp. 3593–3612 (1996).

Hans R. Kricheldorf et al., "Chiral thermotropic copoly(ester–imide)s based on isosorbide[b] and N–(4–carboxyphenyl)trimellitimide," Macromol. Rapid Commun. 16, pp. 231–237 (1995).

Hans R. Kricheldorf et al., "New Polymer Syntheses. LXXXII. Syntheses of Poly(ether–sulfone)s from Silylated Aliphatic Diols Including Chiral Monomers," Journal of Polymer Science: Part A: Polymer Chemistry, vol. 33, pp. 2667–2671 (1995).

Hans R. Kricheldorf et al., "LC–polyimides 26. Photoreactive, nematic or cholesteric poly(ester–imide)s derived from 4, aminocinnamic acid trimellitimide, isosorbide and various diphenols," High Perform. Polym., 7, pp. 471–480 (1995).

Hans R. Kricheldorf et al., "Cholesteric and photoreactive polyesters," Reactive & Functional Polymers, 30, pp. 173–189 (1996).

Mustapha Majdoub et al., Nouveaux Polyéthers Et Polyesters À base D'Isosorbide: Synthèse Et Caractérisation, Eur. Polym. J., vol. 30, No. 12, pp. 1431–1437 (1994).

Masahiko Okada et al., "Synthesis and biodegradability of polyesters based on 1,4:3,6–dianhydrohexitols and sucinic acid derivatives," in *Biodegradable Plastics and Polymers*, Eds. Y. Doi and K. Fukada, Elsevier Science B.V., pp. 511–518 (1994).

Masahiko Okada et al. "Synthesis and Degradabilities of Polyesters from 1,4:3,6–Dianhydrohexitols and Aliphatic Dicarboxylic Acids," Journal of Polymer Science: Part A: Polymer Chemistry, vol. 33, pp. 2813–2820 (1995).

Masahiko Okada et al., "Biodegradable Polymers Based on Renewable Resources: Polyesters Composed of 1,4:3,6–Dianhydrohexitol and Aliphatic Dicarboxylic Acid Units," Journal of Applied Polymer Science, vol. 62, pp. 2257–2265 (1996).

Martin Reinecke and Helmut Ritter, "Branching and crosslinking of an unsaturated oligoester with furfurylamides and sorbic acid amides via Diels–Alder additions," Makromol. Chem. 194 pp. 2385–2393 (1993).

Joachim Thiem et al., "Synthesis of Polyterephthalates Derived from Dianhydrohexitols," Polymer Bulletin 11, pp. 365–369 (1984).

J. Thiem et al., "Darstellung und gezielte Polykondensation von Anhydroalditol–Bausteinen aus Stärke", starch/stärke, 36, Nr.5, pp. 170–176 (1984).

Srinat Wilbullucksanakul et al., "Synthesis of polyurethanes from saccharide–derived diols and diisocyantes and their hydrolyzability," Macromol. Chem., Phys. 197, pp. 135–146 (1996).

V.L. Lapenkov et al., "Polyvinyl ethers of dianhydro derivatives of mannitol and sorbitol," Ref. Zh., Khim. 1973, Abstr. No. 15S298.

Stanislaw Ropuszynski et al., "Preparation of oxyethylene derivatives of esters of dianhydroglucitol and some higher fatty acids and study of their properties," Abstract;Pr. Nauk. Inst. Technol. Org. Tworzyw Sztucznych Politech. Wroclaw., No. 3, pp. 15–38 (1971) with Abstract.

SHEETS FORMED FROM POLYESTERS INCLUDING ISOSORBIDE

RELATED APPLICATION

The following copending applications, filed on even date herewith, all contain related subject matter: U.S. application Ser. Nos.: 09/064,844, 09/086,064, 09/064,846, 09/064,858, 09/064,826, 09/064,719, 09/064,720. The contents of each of the above-identified applications is hereby incorporated by reference.

FIELD OF THE DISCLOSURE

This disclosure relates to a sheet formed from a polyester, methods of making the polyester and articles made from the sheet. More specifically, this disclosure relates to sheets made from a polyester having an isosorbide moiety, terephthaloyl moiety and ethylene glycol moiety, methods of making the same, and articles made therefrom.

BACKGROUND OF THE DISCLOSURE

Polymeric sheets have a variety of uses, such as in signage, glazings, thermoforming articles, displays and display substrates, for example. For many of these uses, the heat resistance of the sheet is an important factor. Therefore, a higher melting point and glass transition temperature ($T_g$) are desirable to provide better heat resistance and greater stability. Further, it is desired that sheets have ultraviolet (UV) and scratch resistance, good tensile strength, high optical clarity and a good impact strength, particularly at low temperatures.

Various polymeric compositions have been used in an attempt to meet all of the above criteria. In particular, polyethylene terephthalate (PET) has been used to form low-cost sheets for many years. However, these PET sheets have poor low temperature impact strength, a low glass transition temperature ($T_g$) and a high rate of crystallization. Thus, PET sheets cannot be used at low temperatures because of the danger of breakage and they cannot be used at high temperatures because the polymer crystallizes, thereby diminishing optical clarity.

Polycarbonate sheets can be used in applications where a low temperature impact strength is needed, or a high service temperature is required. In this regard, polycarbonate sheets have high impact strengths at low temperatures as well as a high $T_g$ which allows them to be used in high temperature applications. However, polycarbonate has poor solvent resistance, thereby limiting its use in certain applications, and is prone to stress induced cracking. Polycarbonate sheets also provide a greater impact strength than is needed for certain applications, making them costly and inefficient for use.

Thus, a need exists for a sheet material that offers (1) high impact strength at low temperature, (2) a higher service temperature (3) good solvent resistance and (4) a low rate of crystallization.

The diol 1,4:3,6-dianhydro-D-sorbitol, referred to hereinafter as isosorbide, the structure of which is illustrated below, is readily made from renewable resources, such as sugars and starches. For example, isosorbide can be made from D-glucose by hydrogenation followed by acid-catalyzed dehydration.

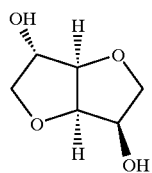

Isosorbide has been incorporated as a monomer into polyesters that also include terephthaloyl moieties. See, for example, R. Storbeck et al, *Makromol. Chem.*, Vol. 194, pp. 53–64 (1993); R. Storbeck et al, *Polymer*, Vol. 34, p. 5003 (1993). However, it is generally believed that secondary alcohols such as isosorbide have poor reactivity and are sensitive to acid-catalyzed reactions. See, for example, D. Braun et al., *J. Prakt. Chem.*, Vol. 334, pp. 298–310 (1992). As a result of the poor reactivity, polyesters made with an isosorbide monomer and esters of terephthalic acid are expected to have a relatively low molecular weight. Ballauff et al, Polyesters (Derived from Renewable Sources), Polymeric Materials Encyclopedia, Vol. 8, p. 5892 (1996).

Copolymers containing isosorbide moieties, ethylene glycol moieties, and terephthaloyl moieties have been reported only rarely. A copolymer containing these three moieties, in which the mole ratio of ethylene glycol to isosorbide was about 90:10, was reported in published German Patent Application No.1,263,981 (1968). The polymer was used as a minor component (about 10%) of a blend with polypropylene to improve the dyeability of polypropylene fiber. It was made by melt polymerization of dimethyl terephthalate, ethylene glycol, and isosorbide, but the conditions, which were described only in general terms in the publication, would not have given a polymer having a high molecular weight.

Copolymers of these same three monomers were described again recently, where it was observed that the glass transition temperature Tg of the copolymer increases with isosorbide monomer content up to about 200° C. for the isosorbide terephthalate homopolymer. The polymer samples were made by reacting terephthaloyl dichloride in solution with the diol monomers. This method yielded a copolymer with a molecular weight that is apparently higher than was obtained in the German Patent Application described above but still relatively low when compared against other polyester polymers and copolymers. Further, these polymers were made by solution polymerization and were thus free of diethylene glycol moieties as a product of polymerization. See R. Storbeck, Dissertation, Universität Karlsruhe (1994); R. Storbeck, et al., *J. Appl. Polymer Science*, vol. 59, pp.1199–1202 (1996).

U.S. Pat. No. 4,418,174 describes a process for the preparation of polyesters useful as raw materials in the production of aqueous stoving lacquers. The polyesters are prepared with an alcohol and an acid. One of the many preferred alcohols is dianhydrosorbitol. However, the average molecular weight of the polyesters is from 1,000 to 10,000, and no polyester actually containing a dianhydrosorbitol moiety was made.

U.S. Pat. No. 5,179,143 describes a process for the preparation of compression molded materials. Also, described therein are hydroxyl containing polyesters. These hydroxyl containing polyesters are listed to include polyhydric alcohols, including 1,4:3,6-dianhydrosorbitol. Again, however, the highest molecular weights reported are relatively low, i.e., 400 to 10,000, and no polyester actually containing the 1,4:3,6-dianhydrosorbitol moiety was made.

Published P.C.T. applications WO 97114739 and WO 96125449 describe cholesteric and nematic liquid crystalline polyesters that include isosorbide moieties as monomer units. Such polyesters have relatively low molecular weights and are not isotropic.

SUMMARY OF THE DISCLOSURE

Contrary to the teachings and expectations that have been published in the prior art, isotropic, i.e., semi-crystalline and amorphous or nonliquid crystalline, copolyesters containing terephthaloyl moieties, ethylene glycol moieties, isosorbide moieties and, optionally, diethylene glycol moieties, are readily synthesized in molecular weights that are suitable for making fabricated products, such as sheets, on an industrial basis.

The process conditions for producing the polyester sheet, particularly the amounts of monomers used in the polyester, are desirably chosen so that the final polymeric product used for manufacturing the sheet contains the desired amounts of the various monomer units, preferably with equimolar amounts of monomer units derived from a diol and a diacid. Because of the volatility of some of the monomers, including isosorbide, and depending on the method of manufacturing the polyester, some of the monomers are desirably included in excess at the beginning of the polymerization reaction and removed as the reaction proceeds. This is particularly true of ethylene glycol and isosorbide.

The polyester may be formed by any method known in the art. Preferably, however, the polyester is formed by solvent or melt polymerization. The choice of method may be determined by the desired amount of diethylene glycol in the final product.

In a preferred embodiment, the number of terephthaloyl moieties in the polymer is in the range of about 25% to about 50 mole % (mole % of the total polymer). The polymer may also include amounts of one or more other aromatic diacid moieties such as, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 25 mole % (mole % of the total polymer).

In a preferred embodiment, ethylene glycol monomer units are present in amounts of about 5 mole % to about 49.75 mole %. The polymer may also contain diethylene glycol moieties. Depending on the method of manufacture, the amount of diethylene glycol moieties is in the range of about 0.0 mole % to about 25 mole %.

In a preferred embodiment, isosorbide is present in the polymer in amounts in the range of about 0.25 mole % to about 40 mole %. One or more other diol monomer units may also be included in amounts up to a total of about 45 mole %.

The polyester has an inherent viscosity, which is an indicator of molecular weight, of at least about 0.35 dL/g, as measured on a 1% (weight/volume) solution of the polymer in o-chlorophenol at a temperature of 25° C. A higher inherent viscosity, such as at least about 0.40 dL/g, preferably at least about 0.50 dL/g, is desired for optimal sheet formation. Further processing of the polyester may achieve even higher inherent viscosities, such as over 1.0 dL/g.

The polyester sheets of the present invention are made by any method known as the art and are suitable for use in a variety of applications, such as glazings, signs, displays and display substrates. The sheets demonstrate good low temperature impact strength, a high $T_g$ resulting in an increased maximum service temperature and decreased crystallinity, thereby providing higher optical clarity.

In addition, the present invention relates to a method of making a polyester article by thermoforming the above described polyester sheet.

DETAILED DESCRIPTION OF THE PREFERRED EMBODIMENTS OF THE DISCLOSURE

The isotropic polyester polymer sheet and a method of manufacturing the same are described in detail below. In particular, a method of manufacturing the polyester comprising terephthaloyl moieties, ethylene glycol moieties and isosorbide moieties is described, as well as the process of forming sheets from such a polymer.

In a preferred embodiment, ethylene glycol monomer units are present in the polymer in amounts of about 33 mole % to about 49.9 mole %, preferably 37 mole % to about 45 mole %, although higher amounts may be included as necessary to achieve the desired results. The polymer composition may also contain diethylene glycol monomer units. Depending on the method of manufacture, the amount of diethylene glycol monomer units is in the range of from about 0.0 mole % to about 5.0 mole %, preferably 0.25 mole % to about 5.0 mole %, although higher amounts may be included as necessary to achieve the desired results. Diethylene glycol may be produced as a by-product of the polymerization process, or may be added directly to the composition to help accurately regulate the amount of diethylene glycol monomer units that are in the polymer.

In preferred embodiments, isosorbide moieties are present in the polymer in amounts in the range of from about 0.25 mole % to about 30 mole %, preferably about 0.25 mole % to about 20 mole %, more preferably about 0.25 mole % to about 12.0 mole %, and most preferably from about 1.0 mole % to about 6.0 mole %, although higher amounts may be included as necessary to achieve the desired results. One or more other diol monomer units may optionally be included in amounts up to a total of about 2.0 mole %, but preferably less than 1.0 mole %. The amount of other diols included may however be higher as necessary to achieve the desired results. Examples of the optional other diol units include aliphatic alkylene glycols having from 3–12 carbon atoms and having the empirical formula HO—$C_nH_{2n}$—OH, where n is an integer from 3–12, including branched diols such as 2,2-dimethyl-1,3-propanediol; cis or trans-1,4-cyclohexanedimethanol and mixtures of the cis and trans isomers; triethylene glycol; 2,2-bis[4-(2-hydroxyethoxy)phenyl] propane; 1,1-bis[4-(2-hydroxyethoxy)phenyl]-cyclohexane; 9,9-bis[4-(2-hydroxyethoxy)phenyl]fluorene; 1,4:3,6-dianhydromannitol; 1,4:3,6-dianhydroiditol; and 1,4-anhydroerythritol.

Terephthaloyl moieties in the polyester may range from 25–50 mole %, but are preferably in the range of from about 40–50 mole %, although higher amounts may be included as necessary to achieve the desired results. Other aromatic diacid moieties in the polymer, if desired, may include, for example, those derived from isophthalic acid, 2,5-furandicarboxylic acid, 2,5-thiophenedicarboxylic acid, 2,6-naphthalenedicarboxylic acid, 2,7-naphthalenedicarboxylic acid, and 4,4'-bibenzoic acid, at combined levels up to about 10 mole %, preferably between 0.01 and 5 mole % of the total polymer, although higher amounts may be included as necessary to achieve the desired results.

It is preferable that equimolar amounts of diacid monomer units and diol monomer units are present in the polymer in order to achieve a high molecular weight and high inherent viscosity, which provide a lower shrinkage rate and higher glass transition temperature ($T_g$) than, for example, poly (ethylene terephthalate). The polyester formed has an inherent viscosity, which is an indicator of molecular weight, of at least about 0.35 dL/g, as measured on a 1% (weight/volume) solution of the polymer in o-chlorophenol at a temperature of 25° C. Preferably, the inherent viscosity is at least about 0.40 dL/g, and preferably between about 0.5 and about 1.0 dL/g, most preferably between about 0.7 and about 1.0 dL/g. However, the inherent viscosity may be as high as 2.0 dL/g, or even higher, as needed.

The molecular weight is normally not measured directly. Instead, the inherent viscosity of the polymer in solution or the melt viscosity is used as an indicator of molecular weight. For the present polymers, the inherent viscosity is measured by the method described previously, with a molecular weight corresponding to an inherent viscosity of about 0.35 dL/g or more. Higher molecular weights corresponding to an inherent viscosity of at least about 0.45 dL/g are preferred, and molecular weights corresponding to inherent viscosities as high as about 1.0 dL/g to 2.0 dL/g or even higher may be obtained if desired. Generally the inherent viscosity/molecular weight relationship can be fitted to the linear equation:

$$log(IV)=0.586 \times log(M_w)-2.9672.$$

The inherent viscosities are a better indicator of molecular weight for comparisons of samples and are used as the indicator of molecular weight herein.

The polyester sheets of the present invention may be amorphous or partially crystalline depending upon the desired properties of the sheet. Compositions having isosorbide at levels of less than about 10% are semi-crystalline if they are cooled slowly after formation or if they are annealed above their glass transition temperatures, but are amorphous if they are cooled rapidly after formation. In general, the semi-crystalline compositions are slower to crystallize than poly(ethylene terephthalate) compositions due to the inclusion of isosorbide. The isosorbide raises the $T_g$, allowing the articles to remain transparent even when exposed to conditions under which they might normally crystallize. Further, the presence of isosorbide reduces the size of any crystals actually formed, thereby allowing optical clarity to be maintained even at higher degrees of crystallization.

The polyesters used to make the sheets of the invention can be made by any of several methods. The product compositions vary somewhat depending on the method used, particularly in the amount of diethylene glycol residue that is present in the polymer. These methods include the reaction of the diol monomers with the acid chlorides of terephthalic acid and any other acids that may be present. The reaction of terephthaloyl dichloride with isosorbide and ethylene glycol is readily carried out by combining the monomers in a solvent (e.g. toluene) in the presence of a base, such as pyridine, which neutralizes HCl as it is produced. This procedure is described in R. Storbeck et al., J. Appl. Polymer Science, Vol. 59, pp. 1199–1202 (1996). Other well-known variations using terephthaloyl dichloride may also be used (e.g. interfacial polymerization), or the monomers may simply be stirred together while heating.

When the polymer is made using the acid chlorides, the ratio of monomer units in the product polymer is about the same as the ratio of reacting monomers. Therefore, the ratio of monomers charged to the reactor is about the same as the desired ratio in the product. A stoichiometric equivalent of the diol and diacids generally will be used to obtain a high molecular weight polymer, e.g., one with an inherent viscosity of at least about 0.35 dL/g, suitable for making sheets.

The polymers can also be made by a melt polymerization process, in which the acid component is either terephthalic acid or dimethyl terephthalate, and also may include the free acid or dimethyl ester of any other aromatic diacids that may be desired in the polyester polymer composition. The diacids or dimethyl esters are heated with the diols (ethylene glycol, isosorbide, optional diols) in the presence of a catalyst to a high enough temperature that the monomers combine to form esters and diesters, then oligomers, and finally polymers. The polymeric product at the end of the polymerization process is a molten polymer. The diol monomers (e.g., ethylene glycol and isosorbide) are volatile and distill from the reactor as the polymerization proceeds. Therefore, an excess of these diols must be charged to the reaction to obtain a polymer, and the amounts must be adjusted according to the characteristics of the polymerization vessel, such as the efficiency of the distillation column and the efficiency of monomer recovery and recycle. Such modifications in the amounts of monomers and the like in accordance with the characteristics of a reactor are readily made by practitioners in the art. Further, a skilled practioner can readily determine the amount of each component desirably charged to any particular reactor to form the polymer of the invention.

The above described melt polymerization process is the preferred method of making the polymer and is described in detail in copending commonly assigned U.S. application Ser. No. 09/064,844, incorporated herein by reference. The melt polymerization processes using dimethyl terephthalate and terephthalic acid are also summarized below.

Dimethyl Terephthalate Process

In this process, which is carried out in two stages, terephthalic acid and the optional diacid monomers, if present, are used as their dimethyl ester derivatives. The diols (e.g. ethylene glycol and isosorbide) are mixed with the dimethyl ester of the aromatic diacid (e.g. dimethyl terephthalate) in the presence of an ester interchange catalyst, which causes exchange of the ethylene glycol for the methyl group of the dimethyl esters through a transesterification reaction. This results in the formation of methanol, which distills out of the reaction flask, and bis (2-hydroxyethylterephthalate). Because of the stoichiometry of this reaction, somewhat more than two moles of ethylene glycol are desirably added as reactants for the ester interchange reaction.

Catalysts that bring about ester interchange include salts (usually acetates) of the following metals: Li, Ca, Mg, Mn, Zn, Pb, and combinations thereof, $Ti(OR)_4$, where R is an alkyl group having 2–12 carbon atoms, and PbO. The catalyst components are generally included in an amount of about 10 ppm to about 100 ppm. Preferred catalysts for ester interchange include $Mn(OAc)_2$, $Co(OAc)_2$, and $Zn(OAc)_2$, where OAc is the abbreviation for acetate, and combinations thereof. The polycondensation catalyst in the second stage of the reaction, preferably Sb(III) oxide, may be added initially or at the start of the polycondensation stage. A catalyst that has been used with particularly good success is based on salts of Mn(II) and Co(II), at levels of about 50 to about 100 ppm, each. These were used in the form of Mn(II) acetate tetrahydrate and Co(II) acetate tetrahydrate, although other salts of the same metals may also be used.

Ester interchange is desirably brought about by heating and stirring the mixture of reactants under an inert atmosphere (e.g. nitrogen) at atmospheric pressure from room temperature to a temperature high enough to induce the ester interchange (about 150° C.). Methanol is formed as a by-product and distills out of the reactor. The reaction is gradually heated to about 250° C. until methanol evolution stops. The end of methanol evolution can be recognized by a drop in the overhead temperature of the reaction vessel.

A small amount of an additive having a boiling point of 170–240° C. may be added to the ester interchange to aid in the heat transfer within the reaction medium and to help retain volatile components in the vessel that may sublime into the packed column. The additive must be inert and not react with alcohols or dimethyl terephthalate at temperatures below 300° C. Preferably, the additive has a boiling point greater than 170° C., more preferably within the range of 170° C. to 240° C., and is used in an amount between about 0.05 and 10 wt %, more preferably between about 0.25 and 1 wt % of reaction mixture. A preferred additive is tetrahydronaphthalene. Other examples include diphenyl ether, diphenyl sulfone and benzophenone. Other such solvents are described in U.S. Pat. No. 4,248,956, the contents of which are hereby incorporated by reference.

The second stage of the reaction is commenced by adding a polycondensation catalyst and a sequestering agent for the transesterification catalyst. Polyphosphoric acid is an example of a sequestering agent and is normally added in an amount of about 10 to about 100 ppm of phosphorous per gm of dimethyl terephthalate. An example of a polycondensation catalyst is antimony (III) oxide, which may be used at a level of 100 to about 400 ppm.

The polycondensation reaction is typically carried out at a temperature from about 250° C. to 285° C. During this time, ethylene glycol distills out of the reaction due to condensation of the bis(2-hydroxyethyl) terephthalate to form polymer and by-product ethylene glycol, which is collected as a distillate.

The polycondensation reaction described above is preferably carried out under vacuum, which can be applied while the reactor is being heated to the temperature of the polycondensation reaction after polyphosphoric acid and Sb(III) oxide have been added. Alternatively, vacuum can be applied after the polycondensation reaction temperature reaches 280° C.–285° C. In either case, the reaction is accelerated by the application of vacuum. Heating under vacuum is continued until the molten polymer reaches the desired molecular weight, usually recognized by an increase in the melt viscosity to a pre-determined level. This is observed as an increase in the torque needed for the stirring motor to maintain stirring at a constant RPM. An inherent viscosity of at least 0.5 dL/g, and generally up to about 0.65 dL/g or greater, can be achieved by this melt polymerization process without further efforts at raising molecular weight. For certain composition ranges, the molecular weight can be increased further by solid state polymerization, described below.

Terephthalic Acid Process

The terephthalic acid process is similar to the dimethyl terephthalate process except that the initial esterification reaction that leads to bis(2-hydroxyethylterephthalate) and other low molecular weight esters is carried out at a slightly elevated pressure (autogenous pressure, about 25 to 50 psig). Instead of a two-fold excess of diols, a smaller excess (about 10% to about 60%) of diols (ethylene glycol, isosorbide and other diols, if any) is used. The intermediate esterification product is a mixture of oligomers, since not enough diol is present to generate a diester of terephthalic acid. The catalysts are also different. No added catalyst is necessary in the esterification reaction.

A polycondensation catalyst (e.g., Sb(III) or Ti(IV) salts) is still desirable to achieve a high molecular weight polymer. The catalyst that is needed to achieve a high molecular weight can be added after the esterification reaction, or it can be conveniently charged with the reactants at the beginning of the reaction. Catalysts that are useful for making a high molecular weight polymer directly from terephthalic acid and the diols include the acetate or other alkanoate salts of Co(II) and Sb(III), oxides of Sb(III) and Ge(IV) and Ti(OR)$_4$ (where R is an alkyl group having 2 to 12 carbon atoms). Glycol solubilized oxides of these metal salts may also be used. The use of these and other catalysts in the preparation of polyesters is well known in the art.

The reaction may be carried out in discrete steps, but this is not necessary. In practice on a large scale, it may be carried out in steps as the reactants and intermediate products are pumped from reactor to reactor at increasing temperatures. In a batch process, the reactants and catalyst may be charged to a reactor at room temperature and then gradually heated to about 285° C. as polymer forms. The pressure is vented in the range of about 200° C. to about 250° C., and a vacuum is then desirably applied.

Esterification to form bis(2-hydroxyethylterephthalate) esters and oligomers takes place at elevated temperatures (between room temperature and about 220° C. to 265° C. under autogenous pressure), and the polymer is made at temperatures in the range of about 275° C. to about 285° C. under a high vacuum (less than 10 Torr, preferably less than 1 Torr). The vacuum is needed to remove residual ethylene glycol and water vapor from the reaction to raise the molecular weight.

A polymer having an inherent viscosity of at least 0.5 dL/g, and generally up to about 0.65 dL/g ,can be achieved by the direct polymerization process, without subsequent solid state polymerization. The progress of the polymerization can be followed by the melt viscosity, which is easily observed by the torque that is required to maintain stirring of the molten polymer.

Solid State Polymerization

Polymers can not be made by the melt condensation process described above having an inherent viscosity of at least about 0.5 dL/g, and often as high as about 0.65 dL/g or greater, without further treatment. Compositions of ethylene glycol, isosorbide, and terephthalic acid having isosorbide in an amount of about 0.25% to about 10% on a mole basis may have their molecular weight increased further by solid state polymerization. The product made by melt polymerization, after extruding, cooling and pelletizing, is essentially non-crystalline. The material can be made semi-crystalline by heating it to a temperature in the range of about 115° C. to about 140° C. for an extended period of time (about 2 to about 12 hours). This induces crystallization so that the product can then be heated to a much higher temperature to raise the molecular weight. The process works best for low levels of isosorbide (about 0.25 mole % to about 3 mole %) because the polyester crystallizes more easily with low levels of isosorbide.

The polymer may also be crystallized prior to solid state polymerization by treatment with a relatively poor solvent for polyesters, such as acetone, which induces crystallization. Solvent induced crystallization is known for polyesters and is described in U.S. Pat. Nos. 5,164,478 and 3,684,766, which are hereby incorporated herein by reference.

The crystallized polymer is subjected to solid state polymerization by placing the pelletized or pulverized polymer into a stream of an inert gas, usually nitrogen, or under a vacuum of 1 Torr, at an elevated temperature, above about 140° C. but below the melting temperature of the polymer for a period of about 2 to 16 hours. Solid state polymerization is generally carried out at a temperature in the range of about 190° to about 210° C. for a period of about 2 to about 16 hours. Good results are obtained by heating the polymer to about 195° to about 198° C. for about 10 hours. This solid state polymerization may raise the inherent viscosity to about 0.8 dL/g or higher.

Sheet Formation

The polyester polymer of the present invention formed by one of the above methods, or by any other method known in the art, may be formed into sheets directly from the polymerization melt. In the alternative, the polyester may be formed into an easily handled shape (such as pellets) from the melt, which may then be used to form a sheet. The sheet of the present invention can be used for forming signs, glazings (such as in bus stop shelters, sky lights or recreational vehicles), displays, automobile lights and in thermoforming articles, for example.

The difference between a sheet and a film is the thickness, but there is no set industry standard to differentiate a film from a sheet. For purposes of this invention, a sheet is defined as having a thickness greater than about 0.25 mm (10 mils). Preferably, the thickness of the sheets of the present invention are from about 0.25 mm to about 25 mm, more preferably from about 2 mm to about 15 mm, and even more preferably from about 3 mm to about 10 mm. In a preferred embodiment, the sheets of the present invention have a thickness sufficient to cause the sheet to be rigid, which generally occurs at about 0.50 mm and greater. However, sheets thicker than 25 mm, and thinner than 0.25 mm may be formed.

Sheets may be formed by any process known in the art, such as extrusion, solution casting or injection molding. The parameters for each of these processes can be easily determined by one of ordinary skill in the art depending upon the viscosity characteristics of the polyester and the desired thickness of the sheet.

The sheet of the invention is preferably formed by either solution casting or extrusion. Extrusion is particularly preferred for formation of "endless" products, such as films and sheets, which emerge as a continuous length. For example, see Published P.C.T. applications WO 96/38282 and WO 97/00284, which describe the formation of crystallizable thermoplastic sheets by melt extrusion.

In extrusion, the polymeric material, whether provided as a molten polymer or as plastic pellets or granules, is fluidized and homogenized. This mixture is then forced through a suitably shaped die to produce the desired cross-sectional sheet shape. The extruding force may be exerted by a piston or ram (ram extrusion), or by a rotating screw (screw extrusion), which operates within a cylinder in which the material is heated and plasticized and from which it is then extruded through the die in a continuous flow. Single screw, twin screw and multi-screw extruders may be used as known in the art. Different kinds of die are used to produce different products, such as sheets and strips (slot dies) and hollow and solid sections (circular dies). In this manner, sheets of different widths and thickness may be produced. After extrusion, the polymeric sheet is taken up by rollers, cooled and taken off by means of suitable devices which are designed to prevent any subsequent deformation of the sheet.

Using extruders as known in the art, a sheet can be produced by extruding a layer of polymer over chilled rollers and then further drawing down the sheet to size (>0.25 mm) by tension rolls. Preferably, the finished sheet is >0.25 mm thick.

For manufacturing large quantities of sheets, a sheeting calendar is employed. The rough sheet is fed into the gap of the calender, a machine comprising a number of heatable parallel cylindrical rollers which rotate in opposite directions and spread out the polymer and stretch it to the required thickness. The last roller smooths the sheet thus produced. If the sheet is required to have a textured surface, the final roller is provided with an appropriate embossing pattern. Alternatively, the sheet may be reheated and then passed through an embossing calendar. The calender is followed by one or more cooling drums. Finally, the finished sheet is reeled up.

The above extrusion process can be combined with a variety of post-extruding operations for expanded versatility. Such post-forming operations include altering round to oval shapes, stretching the sheet to different dimensions, machining and punching and the like, as known to hose skilled in the art.

The polymeric sheet of the invention may be combined with other polymeric materials during extrusion and/or finishing to form laminates or multilayer sheets with improved characteristics, such as water vapor resistance. In particular, the polymeric sheet of the invention may be combined with one or more of the following: polyethylene terephthalate (PET), aramid, polyethylene sulfide (PES), polyphenylene sulfide (PPS), polyimide (PI), polyethylene imine (PEI), polyethylene naphthalate (PEN), polysulfone (PS), polyether ether ketone (PEEK), polyolefins, polyethylene, poly(cyclic olefins) and poly(cyclohexylene dimethylene terephthalate), for example. Other polymers which may be used in combination with the polyester polymer of the invention are those listed in co-pending application Ser. Nos. 09/064,826 and 09/064,720. A multilayer or laminate sheet may be made by any method known in the art, and may have as many as five or more separate layers joined together by heat, adhesive and/or a tie layer, as known in the art.

A sheet may also be formed by solution casting, which produces more consistently uniform gauge sheeting than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, whereon the sheet cools. The sheet is then removed from the belt onto a windup roll. The extrudate thickness is five to ten times that of the finished sheet. The sheet may then be finished in a like manner to extruded sheeting.

Further, sheets and sheet-like articles, such as discs, may be formed by injection molding by any method known in the art.

One of ordinary skill in the art will be able to identify appropriate process parameters based on the polymeric composition and process used for sheet formation.

Regardless of how the sheet is formed, it may be subjected to biaxial orientation by stretching in both the machine and transverse direction after formation. The machine direction stretch is initiated in forming the sheet simply by rolling out and taking up the sheet. This inherently stretches the sheet in the direction of takeup, orienting some of the fibers. Although this strengthens the sheet in the machine direction, it allows the sheet to tear easily in the direction at right angles to the machine direction because all of the fibers are oriented in one direction.

Therefore, biaxially stretched sheets are preferred for certain uses where uniform sheeting is desired. Biaxial stretching orients the fibers parallel to the plane of the sheet, but leaves the fibers randomly oriented within the plane of the sheet. This provides superior tensile strength, flexibility, toughness and shrinkability, for example, in comparison to non-oriented sheets. It is desirable to stretch the sheet along two axes at right angles to each other. This increases tensile strength and elastic modulus in the directions of stretch. It is most desirable for the amount of stretch in each direction to be roughly equivalent, thereby providing similar properties or behavior within the sheet when tested from any direction.

The biaxial orientation may be obtained by any process known in the art. However, tentering is preferred, wherein the material is stretched while heating in the transverse direction simultaneously with, or subsequent to, stretching in the machine direction.

Shrinkage can be controlled by holding the sheet in a stretched position and heating for a few seconds before quenching. This heat stabilizes the oriented sheet, which then may be forced to shrink only at temperatures above the heat stabilization temperature.

The above process conditions and parameters for sheet making by any method known in the art are easily determined by a skilled artisan for any given polymeric composition and desired application.

The properties exhibited by a sheet will depend on several factors indicated above, including the polymeric composition, the method of forming the polymer, the method of forming the sheet, and whether the sheet was treated for stretch or biaxially oriented. These factors affect many properties of the sheet, such as the shrinkage, tensile strength, elongation at break, impact strength, dielectric strength and constant, tensile modulus, chemical resistance, melting point, and the like.

The sheet of the present invention may contain additives typically used in the plastic sheet art such as lubricants, antioxidants, plasticizers, optically active additives, colorants, pigments, fillers and fibers as known in the art. Ultraviolet (UV) stabilizers may also be added as needed, however, the sheet of the invention has inherent UV resistance.

The characteristics of the isotropic polyester polymer of the invention may also be improved by blending the polymer with core-shell elastomers or thermoplastic copolymers having refractive indices equal to that of the polyester polymer. This will increase the toughness of the polyester polymer at ambient and cold temperatures while maintaining the optical transparency. Suitable polymers for blending with the polyester polymer of the invention will be known to those skilled in the art, but may preferably include such polymers as the core-sheet polymers disclosed in U.S. Pat. Nos. 5,321,056 and 5,409,967, incorporated herein by reference.

The characteristics of the isotropic polyester polymers of the invention may also be improved by blending the polymer with one or more other polymers, forming a copolymer which may be formed into a sheet as described herein. For example, a polyester polymer of the invention may be blended with polyethylene to improve its use as a water vapor barrier. Other polymers may be added to change such characteristics as air permeability, optical clarity, strength and/or elasticity.

The sheet of the invention may also be made with the polyesters described in copending application Ser. No. 09/064,720 and the polyester blends described in copending application Ser. No. 09/064,826, the contents of each of which is hereby incorporated by reference.

The sheets of the present invention as described above may be thermoformed by any known method into any desirable shape, such as covers, skylights, shaped greenhouse glazings, and displays. The thermoforming is accomplished by heating the sheet to a sufficient temperature and for a sufficient time to soften the polyester so that the sheet can be easily molded into the desired shape. In this regard, one of ordinary skill in the art can easily determine the optimal thermoforming parameters depending upon the viscosity characteristics of the polyester sheet.

This invention is further illustrated by the following non-limiting examples.

EXAMPLES

Synthesis of Polymers Used for Sheet Applications

The polymer molecular weights are estimated based upon inherent viscosity (I.V.), which is measured for a 1% solution (wt./volume) of polymer in o-chlorophenol at a temperature of 25° C. The levels of catalyst components are expressed as ppm, based on a comparison of the weight of the metal with the weight of either the dimethyl terephthalate or terephthalic acid, depending on which monomer is used.

Example 1

The polymerization reactor employed for this reactor is a 50 gal. maximum capacity, Hastalloy B reactor fitted with a 6" radius, Hastalloy B, water cooled reflux column packed with stainless steel rings, a stainless steel helix agitator stirrer, a water-cooled condenser and by-pass. The following reactants are added to the polymerization reactor: 78.02 Kg dimethyl terephthalate, 15.42 Kg isosorbide, and 49.90 Kg ethylene glycol (which corresponds to a mole ratio of 1:0.26:2.00, respectively). In addition, the catalyst is charged to the reactor and consisted of Mn(II) acetate tetrahydrate (29.57 g), Co(II) acetate tetrahydrate (21.43 g), and Sb(III) oxide (35.02 g). This corresponds to 85 ppm manganese (weight of metal as a fraction of the weight of dimethyl terephthalate), 90 ppm cobalt, and 375 ppm antimony in the reaction mixture.

The stirred reactor (50 rpm) is purged with a stream of nitrogen while the temperature is raised to 250° C. over a period of four hours. The reactor is jacketed and temperature controlled. A hot oil loop system is used as a heating medium. Methanol is continuously collected as the reaction is heated above approximately 150° C. By noting when the temperature drops at the top of the packed reflux column it is possible to determine the end of methanol evolution. The end of methanol evolution indicates the finish of the first step of the reaction, which is the transesterification of the diols and dimethyl terephthalate.

After the temperature drop indicating the end of methanol evolution, 77 ppm of phosphorous is added in the form of a polyphosporic acid solution in ethylene glycol. In the present example, 153 ml of the solution having a concentration of 10.91 g phosphorous per 100 g of polyphosphoric acid solution is used. Also at this time, the nitrogen purge is stopped (but heating is continued). The reaction is heated to 285° C. over a period of about 2 hours. A vacuum is then gradually applied using a multi-vane vacuum pump with 20 horse-power blower. Attaining a full vacuum (less than 1 Torr) takes approximately 1 hour. During this time, ethylene glycol distills off, and a low molecular weight polymer forms. The molten polymer is heated under vacuum at 285° C. for about 2 hours, until the polymer achieves sufficient melt viscosity, as determined by an increase in torque of the stirrer.

When sufficient viscosity is achieved, the polymerization is stopped, and the reactor is emptied through a heated die at the bottom. The molten polymer emerges as a strand that when cooled through immersion in a cold water trough is chopped into pellets. The polymer pellets are dried overnight in a rotating drum heated to 120° C.

The cooled polymer is removed from the flask and ground. The solution inherent viscosity (I.V.) of the material is 0.64 dL/g. The monomer unit composition of the polymer, determined by proton NMR, is about 6% isosorbide, 42% ethylene glycol, 2% diethylene glycol, and 50% terephthalic acid, all expressed as a mole % of the polymer.

It is noteworthy that the amount of isosorbide in the polymer is approximately half of the amount that is charged, when compared with the amount of terephthalic acid. Unreacted isosorbide is found in the distillates, especially in the ethylene glycol. Thus, the amount of isosorbide in the polymer by this process is very dependent on the efficiency of the distillation and/or the separation methods that are used in the process. A skilled practitioner can readily establish specific process details according to the characteristics of the reactor, distillation columns, and the like.

Example 2

The second example is prepared in a manner similar to Example 1, however a smaller reactor (5 gal. maximum capacity) is employed. The reagent equivalent ratios are also changed in order to prepare a polymer with a greater content of isosorbide. Thus, 10,680 g dimethyl terephthalate, 5,787 g isosorbide, and 4,881 g ethylene glycol, (which corresponds to a mole ratio of 1:0.72:1.43, respectively) are charged to the reactor as in Example 1 along with the catalyst which consisted of Mn(II) acetate tetrahydrate (4.76 g), and Ge(IV) oxide (4.66 g). This corresponds to 100 ppm manganese (weight of metal as a fraction of the weight of dimethyl terephthalate) and 300 ppm germanium. The germanium oxide is added in the form of a solution in ethylene glycol (0.100 Normal (N) $GeO_2$ in ethylene glycol). A solution of polyphosphoric acid in ethylene glycol is added as in Example 1. However, in this case, 9.6 ml, phosphoric acid solution (having a concentration of phosphorous of 3.45 g phosphorous per 100 ml) is used. The remaining variables are carried out as in Example 1.

The resultant polymer has a solution I.V. of 0.42 dL/g. The monomer unit composition of the polymer, determined by proton NMR, is about 13% isosorbide, 34% ethylene glycol, 3% diethylene glycol, and 50% terephthalic acid, all expressed as a mole % of the polymer. The extent of isosorbide incorporation is somewhat lower in this case than previously observed but this reflects the efficiency of the differing reactors rather than the polymer made.

Example 3

The third example is prepared in a manner similar to Example 1, except that a larger reactor (100 gal) equipped with a stainless steel anchor-type stirrer is used. The monomers charged are added to result in an isosorbide content in the finished polymer of 1 mole %, assuming that some of the input isosorbide would distill off during polymerization. As such, 197 kg dimethyl terephthalate, 5.12 kg isosorbide, 135 kg ethylene glycol, 72.1 g Mn(II) acetate tetrahydrate, 54.1 g Co(II) acetate tetrahydrate and 88.5 g Sb(III) oxide are used. The catalyst additions correspond to 82 ppm manganese, 65 ppm Co, and 375 ppm Sb, calculated as in Example 1. The transesterification process is carried in a manner analogous to Example 1. A polyphosphoric acid solution in ethylene glycol is added such that 80 ppm of phosphorous is used to sequester the transition metals after the transesterification step and before the polycondensation as outlined in Example 1. The polycondensation is also similar to Example 1. Polymer is extruded and pelletized to give clear, colorless resin.

Unlike the previous examples, the resin produced with lower isosorbide content can be solid-state polymerized. The pelletized polymer was loaded into a tumble dryer and was heated under a stream of nitrogen to 115° C. over 4 hours and then held at that temperature for another 6 hours. This allows the polymer to partially crystallize. After this treatment, a vacuum is applied to the tumble dryer ultimately achieving a vacuum less than 1 mm of Hg. The heating is continued and reached a maximum temperature of 213° C. The polymer is then held at this elevated temperature for a total of approximately 15 hours. This effects a solid-state polymerization and raises the molecular weight of the polymer. In this regard, the solution l.V. of the material increases from about 0.5 dL/g to about 0.7 dL/g during the solid state polymerization.

Example 4

This polymer is prepared in a similar manner to the polymer produced in Example 3 except that the amounts of diols are changed in order to result in a resin with a somewhat increased isosorbide content. Thus, the only alterations are in the amount of isosorbide charged, 17.8 kg, and the amount of Mn(II) acetate tetrahydrate catalyst used, 79.2 g (corresponding to 90 ppm Mn(II) calculated on the same basis as in the above examples). The transesterification and polycondensation are repeated as in Example 3. The finished polymer is pelletized, crystallized, and solid-state polymerized as in Example 3. The resultant polymer contains approximately 3 mole % isosorbide.

Example 5

The materials described in Examples 1–4 are injection molded into discs (thickness ⅛", diameter 4") to measure their multi-axial mechanical impact strength. In addition tensile bars are molded to measure their Notched Izod Impact strength and tensile properties. A Boy 30M (Boy Gmbh, Fernthalr, Germany) was used to injection mold the parts. The conditions used are as follows:

| | |
|---|---|
| barrel temperature: | 300° C. |
| mold temperature: | 50° C. |
| screw speed: | 210 rpm |
| injection speed: | 100% |
| injection pressure: | 13 bar |
| hold pressure: | 12 bar |
| back pressure: | 3 bar |
| injection time: | 2 seconds |
| cooling time: | 25 seconds. |

The mechanical characteristics of the resultant sheets are shown in Table 1. In addition, the results for discs (thickness=⅛ in., approx. 3.3 mm; diameter=4 in.) made from standard PET material are reported. The PET sheet material is obtained from Hostaglas™ (Hoechst AG, Frankfurt, Germany). The multi-axial impact strength is measured by a dropping plunger instrument (Dynatup 8250 made by Instron, Canton, Mass.). The results of the multi-axial impact strength are summarized below in Table 1.

TABLE 1

| Property | ASTM Standard | Ex. 3 | Ex. 4 | Ex. 1 | Ex. 2 | PET |
|---|---|---|---|---|---|---|
| Isosorbide content (mol %) | | 1 | 3 | 6 | 13 | 0 |
| I.V. (dL/g) | | 0.7 | n.a. | 0.64 | 0.42 | n.a. |
| Notched Izod at 20° C. (ft-lb/in) | D256 | 1.08 | 1.15 | 0.75 | 0.42 | 1 |
| Tensile Modulus (Mpsi) | D638 | 0.34 | 0.34 | 0.35 | 0.34 | 0.29 |
| Tensile Elong. @ Break (%) | D638 | 262 | n.a. | 300 | 74 | 200 |
| Tensile Stress at Yield (Ksi) | D638 | 8.5 | 8.4 | n.a. | 8.1 | 8.2 |
| HDT (°C.) at 264 psi | D648 | 65 | 67 | n.a. | 80 | 65 |
| Multi-axial Load (lb) at Max Load (20° C.) | D3763 | 964 | 951 | 1002 | 537 | 877 |
| Multi-axial Load (lb) at Max.Load (−20° C.) | D3763 | 1386 | 1400 | 874 | 492 | 275 |
| Multi-axial Load (lb) at Max. Load (−40° C.) | D3763 | 292 | 356 | 373 | 366 | 200 | n.a. = not available

Example 6

This example illustrates thermoforming and biaxial stretching the polymer made in Example 1. The polymer in Example 1 is used to produce a 14 mil thick sheet by extrusion using a film/sheet pilot line made by Egan Machinery (Somerville, N.J.). The conditions for extrusion are as follows:

| | |
|---|---|
| extruder barrel (zone 1): | 245° C. |
| zone 2: | 245° C. |
| zone 3: | 245° C. |
| zone 4: | 245° C. |
| zone 5: | 265° C. |
| zone 6: | 265° C. |
| Melt line temp.: | 60° C. |
| Die temp.: | 260° C. |
| Roller 1: | 25° C. |
| Roller 2: | 25° C. |
| Roller 3: | 19° C. |

A. Thermoforming

The sheet is trimmed to 6"–7" wide and approximately 11" long. After heating in a rectangular retaining bracket at 165° C. in a convection oven until softening takes place, the sheet is vacuum thermoformed into 1½" and 2" deep room temperature molds to demonstrate ability to thermoform. The obtained containers are optically clear and mechanically robust.

B. Film Stretching

The extruded film is stretched uniaxially and biaxially using a modified Bruckner Stretching Frame (Bruckner, Siegsdorf, Germany). The sample is inserted with the machine direction (MD) on the Y axis of the machine. Draw speed is 1.50 in./sec. Table 2 describes the draw ratios, machine temperatures, and conditions of the stretching, as well as the mechanical properties measured according to ASTM 882.

TABLE 2

| Sheet | Changes to Stretching Conditions | Plaque Preheat Temp (° C.) | Shelter Close Temp (° C.) | Emitter Temp (° C.) | Draw Ratio X (×100%) | Draw Ratio Y (×100%) | Elongation @ break (%) | Modulus (Mpsi) | Strength (Kpsi) |
|---|---|---|---|---|---|---|---|---|---|
| 1 | emitter temp./draw ratio | 110 | 115 | 700 | 1 | 2 | 336 | 0.26 | 6.9 |
| 2 | draw ratio | " | " | " | " | 3 | 206 | 0.29 | 9.3 |
| 3 | preheat | 115 | 120 | " | " | " | 239 | 0.245 | 6.2 |
| 4 | draw ratio | " | " | " | 2 | 1 | 97 | 0.254 | 7 |
| 5 | draw ratio | " | " | " | 3 | " | 49 | 0.25 | 6.2 |
| 6 | draw ratio | " | " | " | 1.41 | 1.41 | 111 | 0.22 | 6.3 |
| 7 | draw ratio | " | " | " | 1.67 | 1.67 | 158 | 0.216 | 4.72 |
| 8 | draw ratio | " | " | " | 2 | 2 | 294 | 0.248 | 6.05 |
| 9 | draw ratio | " | " | " | 2.24 | 2.24 | 80.8 | 0.194 | 3.86 |

It is to be understood that the above described embodiments are illustrative only and that modification throughout may occur to one skilled in the art. Accordingly, this invention is not to be regarded as limited to the embodiments disclosed herein.

What is claimed is:

1. A sheet comprising a polyester, wherein said polyester comprises terephthaloyl moieties, optionally, one or more other aromatic diacid moieties; ethylene glycol moieties; isosorbide moieties; and optionally, one or more other diol moieties, wherein said polyester has an inherent viscosity of at least about 0.35 dL/g when measured as a 1% (weight/volume) solution of said polyester in o-chlorophenol at a temperature of 25° C.

2. The sheet according to claim 1, wherein the sheet has a thickness of greater than about 0.25 mm.

3. The sheet according to claim 1, wherein the sheet has a thickness of greater than 0.25 mm to about 25 mm.

4. The sheet according to claim 1, wherein the sheet is thermoformable.

5. The sheet according to claim 1, wherein the sheet is biaxially oriented.

6. The sheet according to claim 1, wherein said polyester has an inherent viscosity of at least about 0.5 dL/g.

7. The sheet according to claim 6, wherein said polyester has an inherent viscosity of about 0.7 to about 1.0 dL/g.

8. The sheet according to claim 1, wherein said polyester further comprises one or more diethylene glycol moieties.

9. The sheet according to claim 1, wherein said terephathaloyl moieties are present in an amount of from about 40 to about 50 mole % of said polyester, said one or more aromatic diacid moieties are present in an amount up to about 10.0 mole % of the polyester, said ethylene glycol moieties are present in an amount of from about 33 to about 49.9 mole % of said polyester, said isosorbide moieties are present in an amount of from about 0.25 to about 20.0 mole % of said polyester, and said one or more other diol moieties are present in an amount of up to about 2.0 mole % of said polyester.

10. The sheet according to claim 9, wherein said one or more other diol moieties is a diethylene glycol moiety which is present in an amount up to about 5.0 mole % of said polyester.

11. The sheet according to claim 9, wherein said isosorbide moieties are present in an amount of from about 1.0 to 12.0 mole %.

12. The sheet according to claim 1, wherein said terephthaloyl moieties are derived from terephthalic acid or dimethyl terephthalate.

13. The sheet according to claim 1, wherein said one or more other diol moieties are derived from aliphatic alkylene glycols or branched aliphatic glycols having from 3–12 carbon atoms and having the empirical formula HO—$C_nH_{2n}$—OH, where n is an integer from 3–12; cis or trans-1,4-cyclohexanedimethanol or mixtures thereof; triethylene glycol; 2,2-bis[4-(2-hydroxyethoxy)phenyl]propane; 1,1-bis[4-(2-hydroxyethoxy)phenyl]-cyclohexane; 9,9-bis[4-(2-hydroxyethoxy)phenyl]-fluorene; 1,4:3,6-dianhydromannitol; 1,4:3,6-dianhydroiditol; or 1,4-anhydroerythritol.

14. The sheet according to claim 13, wherein said one or more other diol moieties are derived from cis-1,4-cyclohexanedimethanol, trans-1,4-cyclohexanedimethanol, or mixtures thereof.

15. The sheet according to claim 1, wherein said one or more other aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, or 4,4'-bibenzoic acid.

16. The sheet according to claim 15, wherein said one or more other aromatic diacid moieties are derived from isophthalic acid, 2,6-naphthalenedicarboxylic acid, 4,4'-bibenzoic acid, or mixtures thereof.

17. An article comprising the sheet of claim 1.

18. The article of claim 17 selected from the group consisting of signage, glazing, a display substrate and a disc.

19. The article of claim 17, wherein said article is thermoformed or injection molded.

20. A method of making a sheet wherein the sheet comprises a polyester, said method comprising:
a) forming the polyester; and
b) producing a sheet from the polyester;
wherein the polyester comprises terephthaloyl moieties; optionally, one or more other aromatic diacid moieties; ethylene glycol moieties; isosorbide moieties; and, optionally, one or more other diol moieties, wherein said polyester has an inherent viscosity of at least about 0.35 dL/g when measured as a 1% (weight/volume) solution of said polyester in o-chlorophenol at a temperature of 25° C.

21. The method according to claim 20, wherein producing the sheet comprises extruding, solution casting or injection molding the polyester.

22. The method according to claim 20, wherein the sheet has a thickness of greater than about 0.25 mm.

23. The method according to claim 22, wherein the sheet has a thickness of greater than 0.25 mm to about 25 mm.

24. The method according to claim 20, further comprising thermoforming said sheet into a desired shape.

25. The method according to claim 20, wherein said sheet has an inherent viscosity of at least about 0.5 dL/g.

26. The method according to claim 25, wherein said sheet has an inherent viscosity of from about 0.7 to about 1.0 dL/g.

27. The method according to claim 20, wherein said polyester comprises diethylene glycol moieties.

28. The method according to claim 20, wherein said terephthaloyl moieties are present in an amount of about 40 to about 50 mole % of said polyester, said one or more other aromatic diacid moieties are present in an amount of up to about 10 mole % of said polyester, said ethylene glycol moieties are present in an amount of about 33 to about 49.9 mole % of the polyester, said isosorbide moieties are present in an amount of about 0.25 to about 20.0 mole % of said polyester, and said one or more other diol moieties are present in an amount of up to about 2.0 mole % of said polyester.

29. The method according to claim 28, wherein said terephthaloyl moieties are derived from terephthalic acid or dimethyl terephthalate.

30. The method according to claim 28, wherein said one or more other diol moieties are derived from aliphatic alkylene glycols or branched aliphatic glycols having from 3–12 carbon atoms and having the empirical formula HO—$C_nH_{2n}$—OH, where n is an integer from 3–12; cis or trans-1,4-cyclohexanedimethanol or mixtures thereof; triethylene glycol; 2,2-bis[4-(2-hydroxyethoxy)phenyl]propane; 1,1-bis[4-(2-hydroxyethoxy)phenyl]-cyclohexane; 9,9-bis[4-(2-hydroxyethoxy)phenyl]-fluorene; 1,4:3,6-dianhydromannitol; 1,4:3,6-dianhydroiditol; or 1,4-anhydroerythritol.

31. The method according to claim 28, wherein said one or more other aromatic diacid moieties are derived from isophthalic acid, 2,5-furandicarboxylic acid, 2,5-thiophenedicarboxylic acid, 2,6-naphthalenedicarboxylic acid, 2,7-naphthalenedicarboxylic acid, or 4,4'-bibenzoic acid.

32. The method according to claim 28, wherein said isosorbide moieties are present in an amount of from about 1 to about 12 mole %.

33. The method according to claim 28, wherein said one or more other diol moieties comprise an ethylene glycol moiety in an amount of up to about 5.0 mole % of said polyester.

34. The method according to claim 28, wherein the sheet has a thickness greater than 0.25 mm.

35. The method according to claim 28, wherein the sheet is biaxially oriented.

36. The method according to claim 20, wherein forming the polyester comprises:
   (a) combining in a reactor a monomer comprising a terephthaloyl moiety; optionally, one or more other monomers comprising an aromatic diacid moiety; a monomer comprising an ethylene glycol moiety; a monomer comprising an isosorbide moiety; and optionally, one or more other monomers comprising a diol moiety with a condensation catalyst suitable for condensing aromatic diacids and glycols; and
   (b) heating said monomers and said catalyst to a temperature sufficient to polymerize said monomers into a polyester polymer having at least the terephthaloyl moiety, ethylene glycol moiety and isosorbide moiety, wherein said heating is continued for a sufficient time to yield a polyester having an inherent viscosity of at least about 0.35 dL/g when measured as a 1% (weight/volume) solution of said polyester in o-chlorophenol at a temperature of 25° C.

37. The method according to claim 36, further comprising increasing the molecular weight of said polyester by solid state polymerization.

38. The method according to claim 37, wherein said solid state polymerization comprises:
   (a) crystallizing said polyester by heating said polyester at a temperature in the range of about 115° C. to about 140° C.; and
   (b) heating said polyester under vacuum or in a stream of inert gas at an elevated temperature above 140° C. but below the melting temperature of said polyester to yield a polyester having an increased inherent viscosity.

39. The method according to claim 38, wherein said heating step (b) is carried out at a temperature of about 195° to 198° C. for about 10 hours.

40. The method according to claim 38, wherein said increased inherent viscosity is at least about 0.65 dL/g.

* * * * *